United States Patent
Gogarty

[11] 3,822,746
[45] July 9, 1974

[54] USE OF VISCOELASTIC FLUIDS FOR MOBILITY CONTROL

[75] Inventor: William B. Gogarty, Littleton, Colo.

[73] Assignee: Marathon Oil Company, Findlay, Ohio

[22] Filed: Sept. 28, 1972

[21] Appl. No.: 293,294

[52] U.S. Cl.................................. 166/252, 166/275
[51] Int. Cl............................................. E21b 47/00
[58] Field of Search......... 166/250, 252, 275, 305 R

[56] References Cited
UNITED STATES PATENTS

| | | | |
|---|---|---|---|
| 3,303,879 | 2/1967 | Williams | 166/275 |
| 3,315,743 | 4/1967 | Abdo et al. | 166/275 |
| 3,315,744 | 4/1967 | Dunlap | 166/252 |
| 3,338,304 | 8/1967 | Lummus | 166/252 |
| 3,362,473 | 1/1968 | Foster | 166/252 |
| 3,391,736 | 7/1968 | Abdo | 166/275 |
| 3,637,014 | 1/1972 | Jones | 166/275 |

Primary Examiner—Stephen J. Novosad
Assistant Examiner—Jack E. Ebel
Attorney, Agent, or Firm—Joe C. Herring; Richard C. Willson, Jr.; Jack L. Hummel

[57] ABSTRACT

Viscoelastic fluids are efficiently utilized in flooding subterranean reservoirs by first flooding a porous medium representative of the reservoir rock with the formation fluids at the desired velocity of the oil recovery process, then flooding a similar porous medium with the viscoelastic fluid at the same velocity and observing the viscosity thereof and thereafter designing the oil recovery process based on this viscosity. It has been observed that the viscosity of viscoelastic fluids is dependent on the velocity. Examples of useful viscoelastic fluids include micellar solutions, aqueous solutions of polyacrylamides, etc.

7 Claims, 4 Drawing Figures

USE OF VISCOELASTIC FLUIDS FOR MOBILITY CONTROL

BACKGROUND OF THE INVENTION

1. Field of the Invention

Viscoelastic fluids are injected through an injection means into a subterranean reservoir and displaced toward a production means to recover crude oil therethrough.

2. Description of the Prior Art.

Jones, in U.S. Pat. No. 3,637,014 teaches a time-dependent shear thinning liquid useful in secondary oil recovery processes. The liquid retains a relatively low viscosity induced by high shear rates and undergoes an increase in viscosity at lower shear rates.

Also, it has been reported that polyvinyl alcohol-borate complexes have the unique ability to change from Newtonian-like liquid behavior to an elastic material 50 times more viscous, simply on exceeding a threshold shear rate—"Shear Thickening Phenomena in Poly(vinyl) Alcohol-Borate Complexes," J. G. Savins, Sonderdruck aus Rheologica Acta, 7, 87–93, 1968.

Gogarty, in SPE Paper 1566-a, flooded surfactant-stabilized dispersions of water and hydrocarbon through consolidated cores and observed a decrease in apparent viscosity on increase in shear rate at certain frontal velocities.

It has been established that mobility control is a very important design concept for efficient oil recovery processes. Mobility control is accomplished by either increasing the viscosity of the displacing fluid or by decreasing the permeability of the reservoir rock or by a combination of these two.

The prior art has looked at flooding of consolidated cores as being a steady-state condition. However, if one examines the pore size distribution and the overall rheology of the reservoir rock, while observing the flow of fluid through these pores, one realizes that the liquid is subjected to acceleration and deceleration forces rather than a steady-state flow phenomena.

SUMMARY OF THE INVENTION

Applicant has discovered how the viscoelastic character of viscoelastic fluids can be utilized more efficiently in a flooding process. Acceleration and deceleration forces are necessary in the reservoir for this design. applicant's invention is effected by first flooding a porous sample representative of the reservoir rock with formation fluid at a predetermined velocity, thereafter flooding a similar porous sample with the viscoelastic fluid at the same velocity and observing the viscosity of the fluid at that velocity and then using this velocity data to design the flooding process.

BRIEF DESCRIPTION OF THE DRAWINGS

A detailed description of FIGS. 1–4 is given in the working examples. Briefly, these figures represent the pressure drops at different shear rates at different L/Rs (length of tubing divided by the radius of the tube.)

THE PREFERRED EMBODIMENTS OF INVENTION

Figure 1:
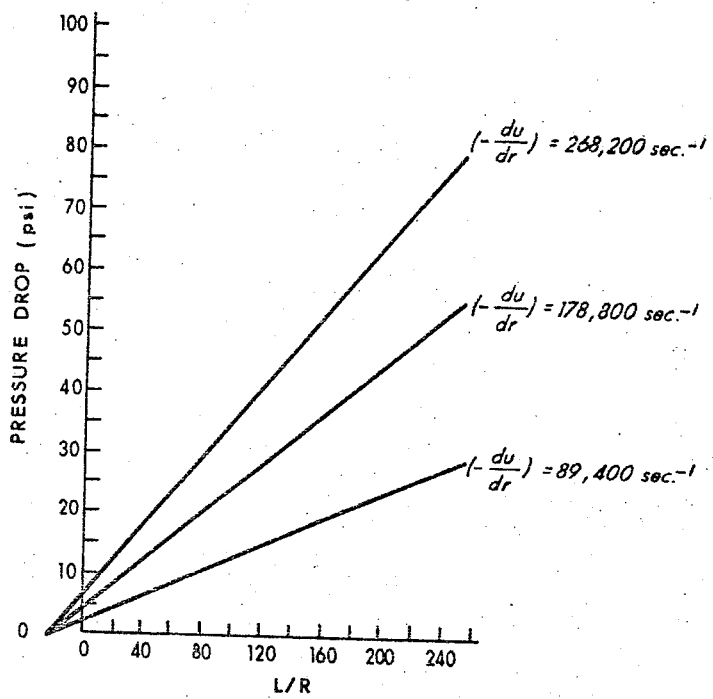

A viscoelastic fluid exhibits a dual behavior. Under steady-state conditions, the fluid acts as a viscous pseudo-plastic fluid and under acceleration and deceleration forces, the fluid exhibits elastic behavior. When working with these fluids using a capillary tube viscometer, a concentric cylinder viscometer (e.g., Brookfield Viscometer) or a cone and plate viscometer, only the viscous component is observed. Only when the fluid is subjected to acceleration and deceleration forces is the elastic component observed. Micellar solutions such as those used in U.S. Pat. Nos. 3,254,714 to Gogarty, U.S. Pat. No. 3,506,070 to Jones, and U.S. Pat. No. 3,497,006 to Jones et al. and certain polymer solutions exhibit a viscoelastic phenomenon. Examples of such micellar solutions include thos containing about 2 to about 90 percent and more preferably about 5 to about 70 percent of hydrocarbon (can be crude oil, a partially refined fraction of crude oil, or a refined fraction of crude oil, or a synthetic hydrocarbon), about 5 to about 90 percent and more preferably about 20 percent to about 75 percent of an aqueous medium; about 4 percent to about 20 percent and more preferably about 6 percent to about 16 percent of a surfactant (preferably a petroleum sulfonate having an average equivalent weight within the range of about 350 to about 525); and optionally about 0.001 percent to about 5 percent and more preferably about 0.01 percent to about 3.5 percent by weight based on the aqueous medium of an electrolyte such as an inorganic acid, inorganic base, or inorganic salt; and/or about 0.01 percent to about 20 percent and preferably about 0.1 percent to about 5 percent of a cosurfactant which preferably contains one to about 20 or more carbon atoms and contains one or more of hydroxy, aldo, epoxy, amino, combinations of two or more of these groups and like groupings; the above percents are based on volume except the electrolyte. The viscoelasticity of the micellar solution is dependent upon the composition and type of components(s), e.g., the cosurfactant concentration gives different results as supported by FIGS. 1 and 2—a complete understanding is within the normal realm of experimentation of the person skilled in the art. Examples of micellar solution components are disclosed in the above patents. The polymer solutions can be aqueous solutions containing synthetic polyelectrolytes such as polymers and copolymers of ethylenically unsaturated monomer(s) and modified materials such as partially hydrolyzed polymers, e.g., polyacrylamide, and copolymers. Preferred copolymers are obtained from sodium acrylate and acrylamide. Partially hydrolyzed, high molecular weight polyacrylamides are particularly useful with this invention, e.g., the Pusher polymers marketed by Dow Chemical Co., Midland, Mich.

When flooding a linear core, if the same volume is flowing into the core as is flowing out of the core, one can assume a steady-state condition exists as to the fluid flowing within the core. Also, it has been the general consensus that the pressure gradient across the core is linear and that the average velocity is the same at any point across the core. However, when examining a given pore within the core, it is realized that the fluid decelerates as it enters the pore and correspondingly accelerates as it leaves the particular pore. This increase and decrease in area of the individual pores within the core necessarily give rise to acceleration and deceleration effects on a viscoelastic fluid.

For polymer solutions, the viscoelasticity depends, among other things, upon the concentration of polymer within the aqueous solution, the type of polymer and the molecular weight of the polymer.

The effects of viscoelasticity of the fluid are advantageously utilized in designing an oil recovery process by the following procedure. First, a porous sample representative of the reservoir to be flooded, is flooded at a predetermined velocity; thereafter, a like sample is flooded with the viscoelastic fluid at the same velocity and the apparent viscosity of the viscoelastic fluid is observed. Then, the observed viscosity is used to design the oil recovery process. This design method can reduce the polymer concentration to a minimum while maintaining the desired mobility control. Also, overdesigning the flooding process can be prevented by this invention. In essence, the combination of the elastic and viscous components is evaluated to obtain an overall, efficient mobility control within the reservoir rock at a predetermined velocity.

Primary, secondary, and tertiary recovery processes can benefit from this technology. The injection means and production means, as used herein, can be effected in one or a plurality of wells. For example, the viscoelastic fluid can be injected through the same well as the formation fluids are produced or it can be injected in one well and displaced toward a different well.

The viscoelastic fluids can be used with flooding processes such as those taught in U.S. Pat. Nos. 3,275,075 to Gogarty et al.; 3,506,070 and 3,506,071 to Jones; 3,497,006 to Jones et al., 3,537,523 to Gogarty et al.; 3,545,546 to Surkalo et al.; 3,572,416 to Kinney et al.; and 3,648,774 to Kirk.

WORKING EXAMPLE

To illustrate this invention, tests are run in an elastic capillary viscometer which is comprised of a reservoir which has inside of it a glass capillary tube. The apparatus has the capability of measuring the pressure drops at different flow rates in tubes of different lengths over radius ratios ($L/R$ ratios). From this apparatus, the pressure drop of the fluid flowing through a particular length tube divided by the radius of the tube indicates the viscoelasticity of the fluid. Unless otherwise specified, the percents are based on volume.

FIG. 1 is representative of the elastic properties of a micellar solution containing 50 percent water (contains about 500 ppm of TDS (total dissolved solids), 40 percent hydrocarbon ($n$-decane plus vehicle oil from the petroleum sulfonate), and 10 percent ammonium petroleum sulfonate having an average equivalent weight of about 466. The micellar solution also contains 0.8 ml (milliters) of amyl alcohol per 100 gms. of the above solution. The data in FIG. 1 is obtained at 25°C. at the indicated shear rates ($du/dr$ is defined as the velocity gradient and represents the mathematical expression for shear rate). The results in FIG. 1 show a positive pressure drop at $L/R = 0$. If the viscous parts of these pressure drops are subtracted from the total at $L/R = 0$, the remaining portion is an indication of the elastic behavior of the fluid.

Figure 2:
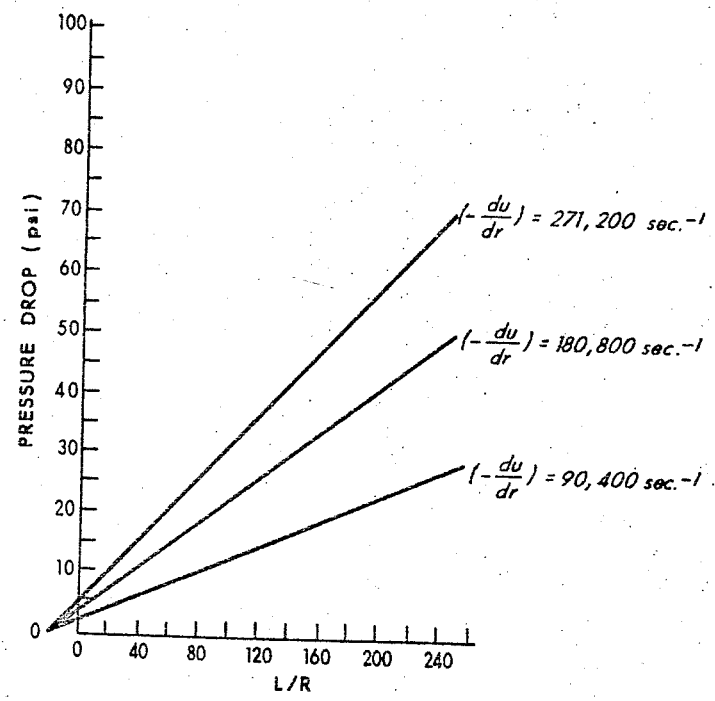

FIG. 2 represents the same data using the same micellar solution except this time it contains 1.4 ml. of amyl alcohol per 100 gms. This figure shows that the higher shear rates give lower pressure drops at $L/R = 0$ for this higher alcohol concentration. Thus, the viscoelasticity of the fluid is dependent upon the composition of the micellar solution.

Figure 3:
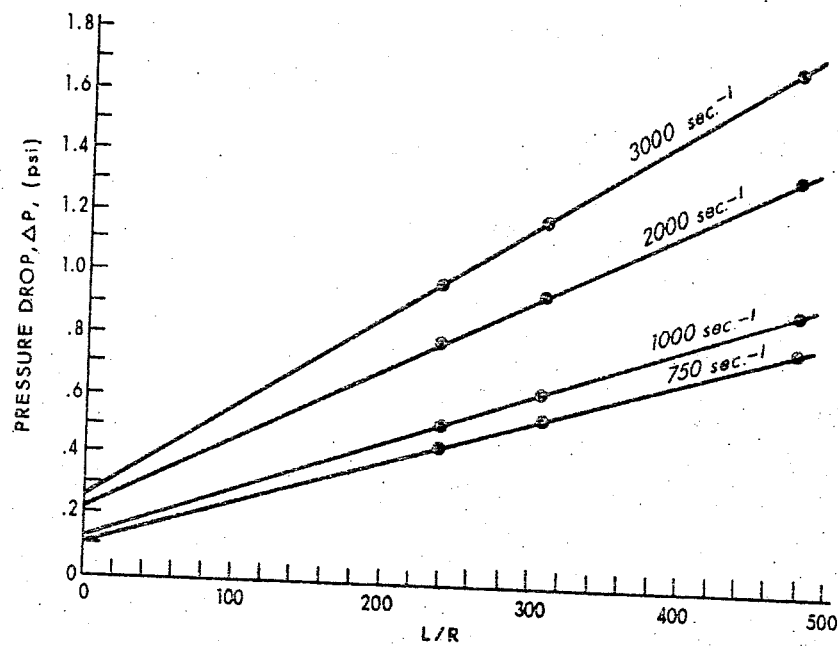

Data in FIG. 3 represents an aqueous polymer solution composed of distilled water, 0.825 gms/liter of calcium chloride, 0.195 gms/liter of sodium sulfate, 0.397 gms/liter of sodium bicarbonate and 1.8 gms/liter of Dow Pusher 700 polymer. The pressure drops at $L/R = 0$ show that this aqueous polymer solution exhibits elastic behavior. The degree of elasticity of a given class of polymers has been found to increase with molecular weight as indicated by the increase in $\Delta p$ at $L/R = 0$.

Figure 4:
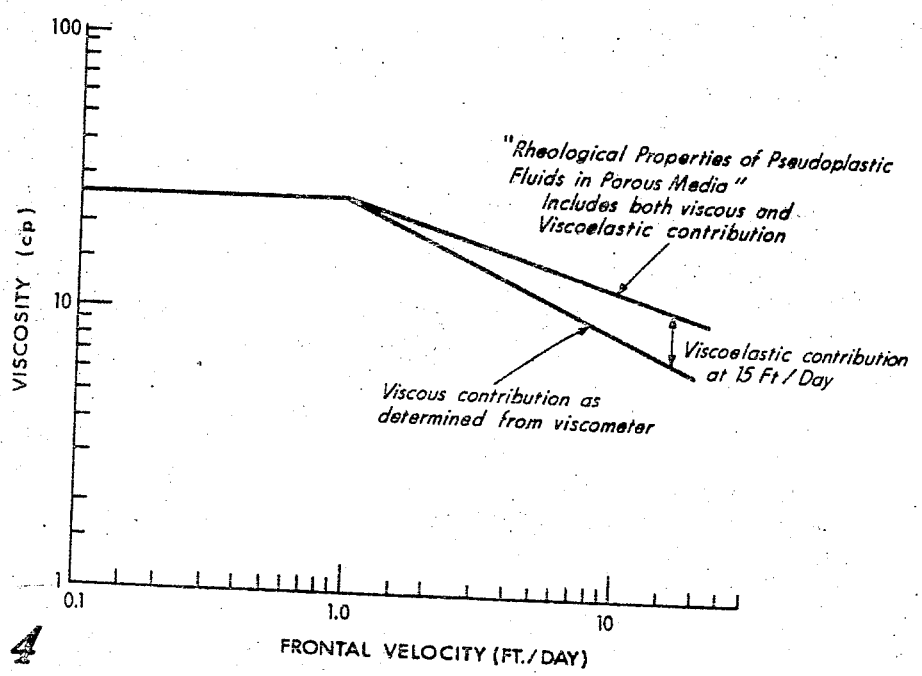

FIG. 4 represents data obtained by observing the apparent viscosities in a consolidated sandstone core and in a steady-state viscometer. The fluid studied is a micellar solution containing 11.3 percent ammonium petroleum sulfonate (average equivalent weight = 460), 0.7 percent isopropanol, 68 percent crude column overheads, and 20 percent water containing 500 ppm. of TDS. This figure illustrates the effects of viscoelasticity in flow through porous media vs. that which one normally observes in a steady state viscometer. Of course, the actual region where viscoelasticity occurs will depend on the rock properties as well as the properties of the micellar solution. That is, for a given frontal velocity, as illustrated in FIG. 4, the apparent viscosity in the core sample is higher than measured by the steadystate viscometer. For example, at 15 ft/day, the apparent viscosity measured in the core is 11.3 cp whereas that measured on the viscometer is 7.4 cp. This Figure illustrates the necessity for following applicant's teachings to obtain an efficient and economical flooding process with good mobility control.

It is not intended that this invention be limited by the specifics taught herein; rather, all equivalents obvious to those skilled in the art are intended to be incorporated within the scope of the invention as defined in the specification and appended claims.

What is claimed is:

1. An improved process of flooding a subterranean reservoir with a viscoelastic fluid wherein the reservoir is in fluid communication with an injection means and a production means, the improved process comprising:

1. determining the viscosity of the formation fluids of the reservoir flowing in a porous sample representative of the reservoir at a predetermined velocity, then
   2. flooding a porous sample representative of the reservoir at the same velocity with the viscoelastic fluid and determining the apparent viscosity of the viscoelastic fluid at the particular velocity, then
   3. preparing a slug of the viscoelastic fluid from the determination of the viscosity of the formation fluids of step (1) and the apparent viscosity in step (2) by incorporating a sufficient concentration of viscoelastic fluid to maintain a desired mobility control within the reservoir at a predetermined velocity and then
   4. injecting the slug into the reservoir and displacing it toward the production means to recover crude oil therethrough.

2. The process of claim 1 wherein the viscoelastic fluid is a micellar solution.

3. The process of claim 2 wherein the micellar solution is comprised of about 5 percent to about 70 percent hydrocarbon, about 20 percent to about 75 percent aqueous medium, and about 4 percent to about 20 percent of surfactant, the percents based on volume.

4. The process of claim 3 wherein the surfactant is a petroleum sulfonate having an average equivalent weight within the range of about 350 to about 525.

5. The process of claim 1 wherein the viscoelastic fluid is an aqueous solution comprised of a polymer or a copolymer or a combination of the polymer and the copolymer.

6. The process of claim 5 wherein the fluid is a partially hydrolyzed, high molecular weight polyacrylamide.

7. The process of claim 5 wherein the fluid is a copolymer of acrylamide and sodium acrylate.

* * * * *